Dec. 15, 1964   F. MELLION ETAL   3,161,321
DISPENSING DEVICE HAVING A GROOVED DISPENSING WHEEL
Filed Nov. 5, 1962
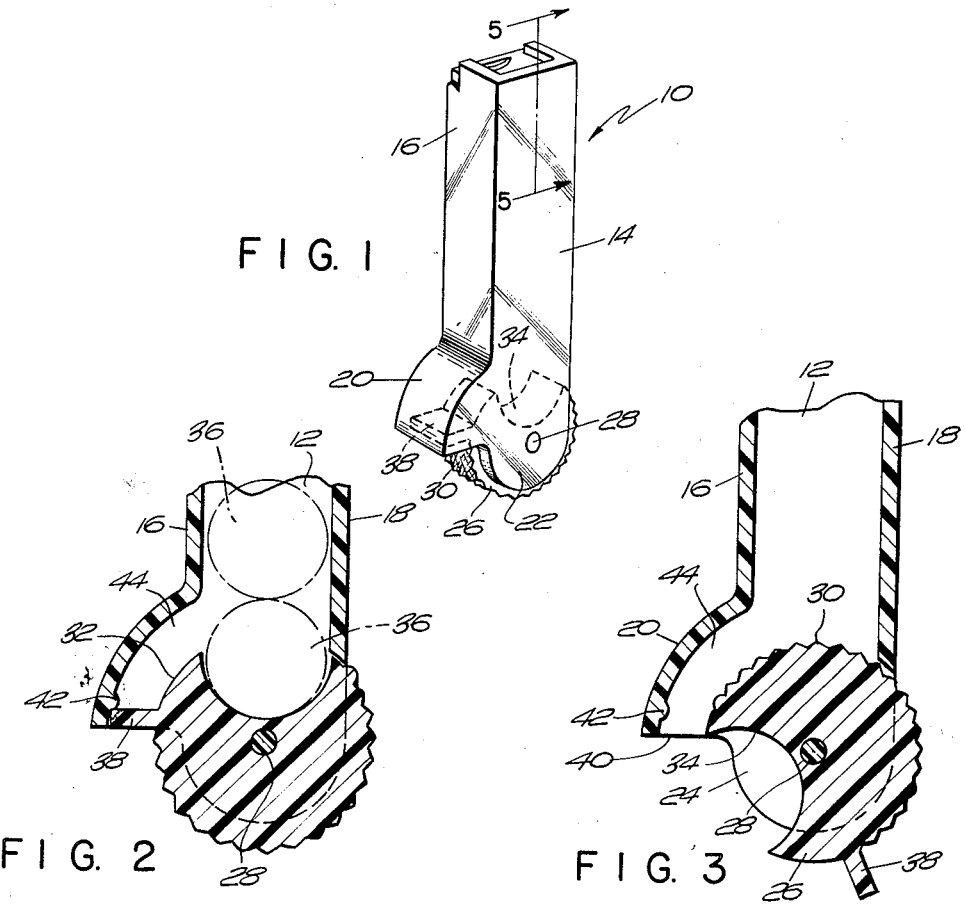
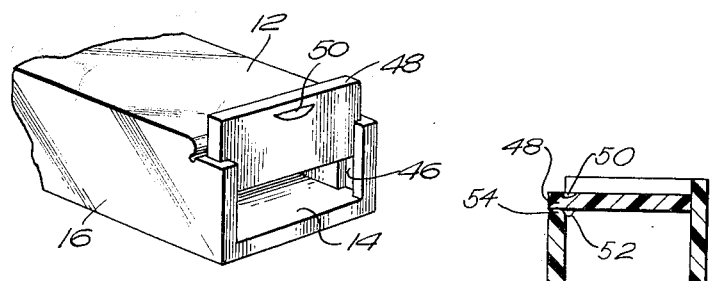
INVENTOR.
FRANK MELLION
JOSEPH DI DOMENICO
BY
Salter + Michaelson
ATTORNEYS United States Patent Office 3,161,321
Patented Dec. 15, 1964

3,161,321
DISPENSING DEVICE HAVING A GROOVED
DISPENSING WHEEL
Frank Mellion and Joseph Di Domenico, Providence, R.I., assignors to Jo-Dee Corp., Providence, R.I., a corporation of Rhode Island
Filed Nov. 5, 1962, Ser. No. 235,483
2 Claims. (Cl. 221—266)

The present invention relates to a dispensing device. More particularly, the present invention relates to a device for dispensing small cylindrical articles from a container wherein the articles are stored in generally vertical stacked relation.

The dispensing device embodied herein is adapted for use in the storing and dispensing of small cylindrical objects, such as batteries for use in hearing aids. It will be understood, however, that other forms and types of articles can also be stored in the dispensing device embodied herein so long as the physical dimensions thereof are within the specifications required for being received within the dispensing container. The device for dispensing articles embodied in the present invention is relativley small in overall dimensions since the preferred article for dispensing therefrom is a hearing aid battery. It is also desirable to dispense from the dispensing container of the present invention a single article at a time. For this purpose, the dispensing container is constructed in a unique configuration and includes a dispensing wheel that is formed with an article receiving groove therein. Since the articles to be dispensed from the container are disposed therein in vertically stacked relation, the lowermost of the articles is received within the dispensing wheel, wherein rotation of the wheel results in movement of the article through a dispensing passage for dispensing through an opening located at the lowermost end of the container. When the dispensing wheel is located in the normal position thereof, the groove formed therein communicates with the interior of the container. In this position, a small tab integrally formed on the wheel cooperates with an arcuate portion of the container that forms the dispensing passage with the wheel to enclose the dispensing passage. Rotation of the wheel automatically moves the tab from the closure position, and further rotation of the wheel moves the article to be dispensed through the dispensing passage and then through the dispensing opening. The uppermost end of the container through which the articles are inserted for loading the container is adapted to be closed by a slide closure on which a protuberance is formed for positively locking the closure when the container is fully loaded with the articles to be dispensed.

Accordingly, it is an object of the present invention to provide a device for individually dispensing articles therefrom.

Another object of the present invention is to provide a dispensing container for dispensing small cylindrical objects wherein a dispensing wheel having a groove formed therein is adapted to carry each of the cylindrical objects from a storage position to a dispensing opening for the dispensing thereof from the container.

Still another object is to provide a dispensing wheel for use in a dispensing device which includes a closure tab that communicates with the dispensing opening for closing the dispensing opening when the wheel is located in the normal position thereof.

Still another object is to provide a dispensing container, the upper portion of which has a generally rectangular cross sectional configuration and the lower portion of which includes an arcuate section that is spaced from the dispensing wheel to form a dispensing passage, the dispensing wheel moving the articles to be dispensed through the dispensing passage during the dispensing operation.

Still another object is to provide a dispensing container in which the articles to be dispensed are loaded in the container from the upper end thereof, the upper end of the container being normally closed by a slide closure which has a positive lock element integrally formed thereon.

Other objects, features and advantages of the invention will become apparent as the description thereof proceeds when considered in connection with the accompanying illustrative drawings.

In the drawings which illustrate the best mode presently contemplated for carrying out the present invention:

FIG. 1 is a perspective view of the dispensing container embodied in the present invention;

FIG. 2 is a vertical sectional view of the lower portion of the dispensing container illustrated in FIG. 1 and showing the dispensing wheel thereof in the closed position thereof;

FIG. 3 is a vertical sectional view similar to FIG. 2 and showing the dispensing wheel after it has been rotated for the dispensing of an article from the container;

FIG. 4 is a fragmentary perspective view of the upper portion of the dispensing container showing the closure therefor; and FIG. 5 is a sectional view taken along lines 5—5 in FIG. 1.

Referring now to the drawings, the dispensing container embodied herein is generally indicated at 10, and, as will be described, is of such shape and configuration so as to accommodate a plurality of small cylindrical objects in vertically stacked relation therein. As mentioned hereinabove, the dispensing container of the present invention has particular application in the dispensing of small batteries such as those used in hearing aids. However, it will be understood that objects other than hearing aid batteries may be stored in the container of the present invention and dispensed therefrom.

As shown in the drawing, the dispensing container 10 includes a tubular body portion, the upper portion of which is generally rectangular in cross sectional configuration. The tubular body portion of the dispensing container 10 includes side walls 12 and 14 and end walls 16 and 18, the side and end walls being integrally joined together and preferably being molded in a one-piece construction. The lowermost ends of the side walls 12, 14 and end wall 16 are formed in an arcuate configuration to define an arcuate portion 20. The side walls 12 and 14 extend downwardly below the arcuate portion 20, and since the end wall 18 is foreshortened with respect to the side walls, spaced ears 22 and 24 are formed. As will be described hereinafter, the arcuate portion 20 cooperates with a dispensing wheel to define a dispensing passage through which articles to be dispensed are discharged from the container 10.

Located between the spaced ears 22 and 24 is a dispensing wheel 26 that defines the means for dispensing the articles from the container 10. The dispensing wheel 26 has a width that permits the wheel to be inserted between the ears 22 and 24 in snug relation therewith but provides for the relative movement of the wheel with respect to the years. A shaft 28 extends through the axis of the wheel 26 and through the ears 22, 24 for rotatably mounting the dispensing wheel 26 between the ears. The diameter of the dispensing wheel 26 is such that the periphery of the wheel extends outwardly beyond the ears 22, 24 so that it may be engaged by the finger of the user of the device. It will be noted that the periphery of the dispensing wheel is roughened or knurled as indicated at 30 whereupon the wheel may more easily be rotated by the finger of the user of the device. It will be noted, however, that a portion of the dispensing wheel indicated at 32 is not formed with a roughened surface, and, as will be described, this peripheral portion of the dispensing wheel defines a portion of a dispensing passage through which the cylindrical articles are dispensed. Although the unroughened peripheral portion 32 of the wheel 26 defines a portion of the dispensing passage, it does not aid in the dispensing operation through the passage as will be described.

The axis of the dispensing wheel 26 is generally concentric with the arcuate portion 20 of the container, the arcuate portion thus cooperating with the dispensing wheel 26 for dispensing the articles within the container. In the normal position of the dispensing wheel 26, a groove indicated at 34 that is formed therein communicates with the hollow tubular body in which the small cylindrical objects or articles indicated at 36 are located in vertical stacked relation. In this position of the groove 34, the lowermost of the articles 36 is received within the groove and is positioned for dispensing upon rotation of the wheel 26. As seen in FIG. 2, in the normal position of the wheel 26, a tab 38 is integrally formed on the wheel 26 and engages the lower end of the arcuate portion 20 and thus acts as a closure for the dispensing opening 40 that is defined by the arcuate portion 20 and the dispensing wheel 26. A protuberance 42 is formed on the inner wall of the arcuate portion 20 and thus defines a stop for the tab 38 for positively locating the tab in the closure position thereof when the wheel 26 is disposed in the normal position thereof as illustrated in FIG. 2.

In the dispensing operation, the lowermost cylindrical article 36 is adapted to be moved through the dispensing passage indicated at 44 and discharged through the dispensing opening 40. In order to carry out the dispensing operation, the dispensing wheel 26 is rotated counterclockwise as seen in FIGS. 2 and 3, thereby moving the article 36 from its seated position in the groove 34 of the dispensing wheel 26 through the dispensing passage 44. When the article 36 reaches the dispensing opening 40, it will fall clear of the container since the groove 34 is then facing in a downward position as illustrated in FIG. 3. It is understood that the wheel 26 is readily movable with respect to the tubular body portion so as to move the article 36 located in the groove 34 thereof through the dispensing passage 44 and dispensing opening 40. After the discharge of the article 36 located in the groove 34, the wheel 26 is then returned to the normal position thereof as illustrated in FIG. 2, in which position the next lowermost cylindrical article 36 drops into the groove 34 for being dispensed in the manner just described.

Referring now to FIGS. 4 and 5, the uppermost end of the container 10 is illustrated and shows the loading end of the tubular body portion of the container. As shown in FIG. 4, the side wall 12 is foreshortened with respect to the end walls 16 and 18 so as to form a notch at the upper end of the container. The interior surfaces of the end walls 16 and 18 are formed with slots 46 that receive a slide closure 48 in slidable relation therein. The slide closure 48 is dimensioned so as to fully cover the uppermost end of the side and end walls of the container. A finger groove 50 is formed in the outer surface of the closure slide 48 and provides for easy opening and closure thereof as desired. As seen in FIG. 5, the inner surface of the slide closure 48 is provided with a projection or protuberance 52 that is rounded and defines a lock for the slide closure 48. The notched end of the side 12 is rounded as illustrated in FIG. 5 at 54 and thus cooperates with the protuberance 52 to enable the protuberance to move therepast to the locking position. Since the slide closure 48 will yield to some degree in the movement thereof in the slots 46, the slide closure 48 can be moved to the locked position as illustrated in FIG. 5 or removed therefrom without too much difficulty. However, it will be understood that the protuberance 52 will hold the slide closure 48 in the locked position thereof and will prevent the inadvertent dislodging thereof from the locked position.

The dispensing container embodied in the present invention is simple in construction and may be operated with one hand to dispense an article therefrom. All of the materials of the container are preferably molded of an inexpensive plastic material so that the container may be inexpensively manufactured in large quantities. The use of the plastic materials provides for forming of the container walls in various colors or transparent, as the user so desires. It is understood that if the walls are formed transparent, the number of articles remaining in the container will be easily visible, thereby facilitating refill requirements. The dispensing wheel 26 is also molded of a plastic material and may be rotatably mounted between the side walls of the container by the shaft 28 or by projections formed as part of the side walls. The manner of mounting the dispensing wheel 26 is not critical to the invention so long as the wheel 26 is mounted in the position as illustrated and described and can be rotated to dispense the articles 36 from the container through the dispensing passage 44 and dispensing opening 40.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a device for storing and dispensing articles, a hollow tubular body in which said articles are contained in generally vertically stacked relation, said body including opposed side walls and opposed end walls that form the upper portion of said tubular body in a generally rectangularly shaped cross sectional configuration, the lower portion of one of said end walls including an arcuate portion and the other of said end walls being foreshortened with respect to the adjacent side walls so that spaced depending ears are formed on said side walls, said spaced ears being located adjacent said arcuate portion, and a dispensing wheel mounted for rotation between said spaced ears, a portion of the periphery of said wheel extending outwardly of said spaced ears and outwardly of the other of said end walls for engagement by the user of the device, the periphery of said wheel being further spaced from the inner surface of said arcuate portion to define an interior arcuate discharge passage and a dispensing opening for said articles, said wheel including a groove that is formed therein and that normally communicates with the interior of said hollow body for receiving the lowermost of the stacked articles therein, wherein rotation of said wheel carries the article located in said groove through said dispensing passage and dispensing opening for dispensing of said article from said device, said dispensing wheel including an outwardly extending tab formed on the periphery thereof and that is shaped and proportioned for insertion into the dispensing opening, said tab defining a finger grip for rotating said wheel and further defining a closure for closing said dispensing opening when said wheel is located such that the groove therein communicates with the interior of said hollow body.

2. In a device as set forth in claim 1, a stop formed on the interior of said arcuate portion and adjacent said dispensing opening, said stop projecting outwardly into said dispensing passage and receiving the end of said tab for limiting movement of said wheel and defining the closure position for said tab, wherein said tab closes said dispensing opening.

References Cited in the file of this patent
UNITED STATES PATENTS

| | | |
|---|---|---|
| 1,773,329 | Upham | Aug. 19, 1930 |
| 2,878,964 | Avis | Mar. 24, 1959 |

FOREIGN PATENTS

| | | |
|---|---|---|
| 141,474 | Great Britain | Apr. 22, 1920 |
| 1,128,646 | France | Jan. 8, 1957 |